United States Patent [19]

Roy et al.

[11] Patent Number: 4,645,162

[45] Date of Patent: Feb. 24, 1987

[54] LEG SUPPORT STRUCTURE

[76] Inventors: Bertrand Roy, P.O. Box 177, Ste-Adele, Que., Canada, J0R 1L0; Luc Paquin, 2957 Chemin des Epinette, Mont Roland, Quebec, Canada

[21] Appl. No.: 832,638

[22] Filed: Feb. 25, 1986

[51] Int. Cl.[4] .......... F16M 11/32
[52] U.S. Cl. .......... 248/439; 182/155
[58] Field of Search .......... 248/439, 188.6, 166; 182/155, 181, 225; 108/132, 129, 131, 133

[56] References Cited

U.S. PATENT DOCUMENTS

| | | | |
|---|---|---|---|
| 267,928 | 11/1882 | Pinckney | 248/439 X |
| 359,565 | 3/1887 | Hanson | 248/439 X |
| 2,478,502 | 8/1949 | Peterson | 108/132 |
| 3,233,701 | 2/1966 | Hentzi et al. | 182/155 |
| 3,267,886 | 8/1966 | Glass | 108/132 UX |
| 4,191,111 | 3/1980 | Emmert | 248/439 X |
| 4,515,243 | 5/1985 | Prior | 182/155 |

FOREIGN PATENT DOCUMENTS

| | | | |
|---|---|---|---|
| 761485 | 3/1934 | France | 182/155 |

*Primary Examiner*—J. Franklin Foss

[57] ABSTRACT

A leg support structure for securement to a board or table top whereby to form a workhorse, table, or other support member intended to be supported in an elevated position. The support structure comprises a leg attachment bracket having a pair of leg members pivotally secured thereto. An attachment plate is provided for securing the bracket to a board, etc. Stationary abutment members are connected to the bracket to maintain the leg members in a position of use with the leg members depending from the attachment plate and angulated towards a first inclined direction and a second outwardly inclined direction. An arresting member is also secured to the bracket to retain the leg members captive between the arresting abutment members to maintain the leg members in position of use and to release the leg members whereby they may be hingedly displaced to a storage position where the leg members lie in close side-by-side relationship.

14 Claims, 11 Drawing Figures

LEG SUPPORT STRUCTURE

BACKGROUND OF INVENTION (a) Field of the Invention

The present invention relates to an improved leg support structure which is connectable to a support element, such as a board, table top, etc., whereby to keep same supported in an elevated position. The leg support structure is collapsible to a storage position thereby taking very little space for ease of transportation and storage, either assembled or unassembled. The structure is particularly, although not exclusively, useful to construct a sawhorse wherein the legs of opposed structures secured to a board may be collapsed upon the board to make the sawhorse easily transportable and storable.

(b) Description of Prior Art

There is a need to provide a leg support structure which is particularly useful for the construction of a sawhorse and wherein the leg structure is collapsible on the support board forming the sawhorse for ease of storage and transportation. There is also a need for a leg support structure of this type which is adaptable to various types of support members which are required to be supported at an elevated position and wherein the leg support structure is easy to adapt to the support member and collapses thereon to take very little space for storing the structure.

Presently, sawhorses are either constructed from rectangular wood pieces as a unitary structure. There also exists a leg structure formed of tubular steel which is connected at opposed ends of a board whereby to form a workhorse. Both these structures are intended to be of a permanent structure, they are bulky, difficult to store and transport, and often impractical to use in certain restricted areas, such as staircases, hallways, etc.

SUMMARY OF INVENTION

It is a feature of the present invention to provide a leg support structure which is easily connected to a board to form a workhorse and wherein the structure has leg members which are collapsible to make the workhorse easily transportable and storable.

A further feature of the present invention is to provide a leg support structure which is securable to a support member of wood, metal, plastics or other material, whereby to form tables, workbenches, stools, or other such structures and wherein the leg members are collapsible to provide a compact structure for ease of transport and storage.

Another feature of the present invention is to provide a leg support structure which is easy to install, easy to use, provides safety, is structurally solid, can carry heavy loads without stressing the leg connections and is versatile to use.

According to the above features, from a broad aspect, the present invention provides a leg support structure comprising a leg attachment bracket having a pair of leg members pivotally secured thereto. Load transfer means is provided for transferring a load disposed on the support member axially along the leg members. Attachment means is provided for securing the bracket to a support member to be supported elevated by the leg members. Arresting means is provided to maintain the leg members in a position of use with the leg members depending from the attachment means and angulated toward a first inclined direction and a second outwardly inclined direction. The pivot connection permits the leg members to be disposed between the arresting means in the position of use and to displace the leg members to a storage position where the leg members lie in a close side-by-side relationship.

BRIEF DESCRIPTION OF DRAWINGS

A preferred embodiment of the present invention will now be described with reference to the example thereof as illustrated in the accompanying drawings in which.

DESCRIPTION OF PREFERRED EMBODIMENTS

Figure 1A:
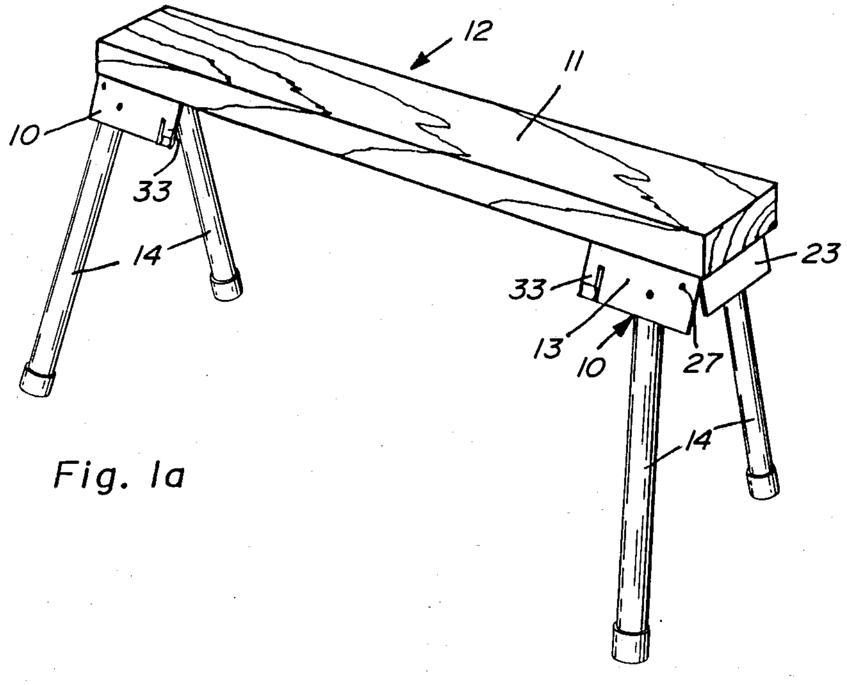
FIG. 1*a* is a perspective view of the leg support structure utilized in the construction of a sawhorse and showing the leg support structure in its position of use.
Figure 1B:
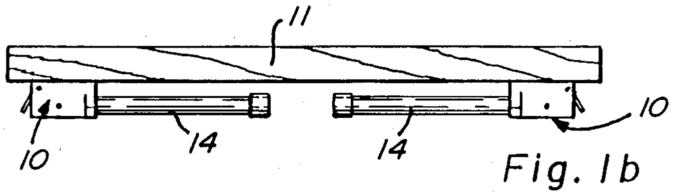
FIG. 1*b* is a side view of the sawhorse of FIG. 1*a*, but showing the leg support structure in its collapsed or storage position.

Referring to the drawings, and more particularly to FIGS. 1*a* and 1*b*, there is shown a pair of leg support structures 10 of the present invention as secured to a board 11 whereby to constitute a sawhorse 12. Each leg support structure 10 is comprised of a structural attachment bracket 13 having a pair of leg members 14 pivotally secured thereto. These leg members are hingedly connected to the bracket 13 and displaceable to a position of use as shown in FIG. 1*a*, or a storage position as shown in FIG. 1*b*. In the storage position, the leg members 14 lie in close side-by-side relationship and extend along an axis substantially parallel to the long axis of the board 11 whereby to constitute a compact structure which is easily transportable and storable. It is pointed out that FIGS. 1*a* and 1*b* only illustrate one application of the leg support structure 10 of the present invention and there are numerous other applications, such as to construct benches, tables, stools, etc.

Referring now additionally to FIGS. 2 to 5, there will be described the construction of the structural leg support bracket 13. As hereinshown, the bracket 13 is preferably, but not exclusively, constructed of metal, and consists of a piece of sheet metal die formed to define a flat attachment wall 15 having outwardly inclined side wall members 16. A load transfer member 17 is secured across the side walls 16. This member 17 is an angle member defining a structural wall 17' having its bottom surface angulated to lie transversely to the long axis 50 of the leg members 14 when in their angled position of use whereby to receive, in abutment, a top end 14' of each leg member 14 whereby a load disposed on the wall 15 will be transferred axially along the leg members from a top end thereof. The other wall 17" of the angle member constitutes a leg abutment member.

Figure 4:
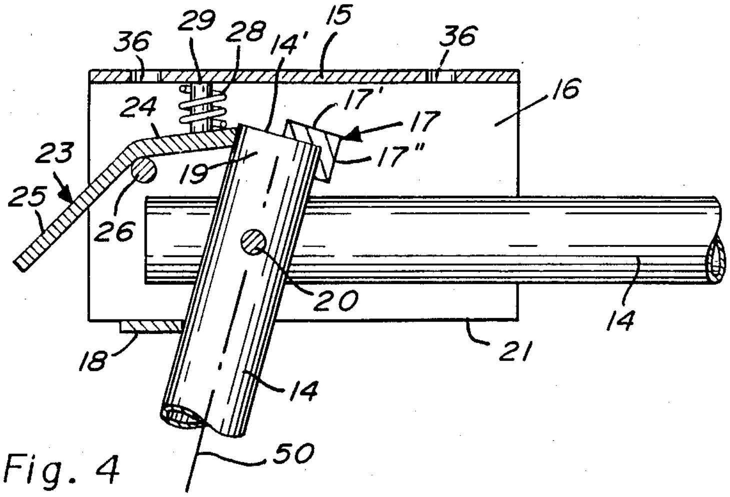
FIG. 4 is a fragmented side section view showing the leg attachment bracket and its mechanism.

A pair of spaced stationary leg abutment members 17" and 18 are secured to the angulated side wall members 16 by welding or other suitable securement means. These abutment members are welded across the side walls 16 under the top attachment wall 15 at a precise position whereby to receive a top end portion 19 of an associated leg member 14 which is povitally connected on a pivot pin 20 located below the metal brace 17. Because the load on the wall 15 is transferred through the wall 17' of member 17, the pivot pin is free of load bearing. The second metal brace 18 is secured transversely across a bottom edge 21 of the angulated side wall 16 and on an opposite side of the pivot pin 20 or the leg 14 as the side having the wall 17" as shown in FIG. 4. When in its position of use, the top end portion 19 of the leg member locates itself under the metal walls 17' and against wall 17" and a further portion below the pivot pin abuts the metal brace 18 whereby the leg member 14 is retained angularly rearward of the bracket, at a desired support angle whereby to provide stability when the leg support structure is secured to a support member such as the board 11.

Figure 8:
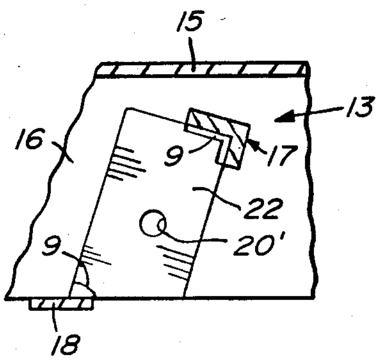
FIG. 8 is an enlarged fragmented view showing the structural bracing of the bracket.

Each leg 14 of the pair of legs is hinged on a respective pivot pin 20 which extends from a respective angulated side wall member 16 to a pivot support structure comprised of a pair of flanges or braces 22 which are welded to and extend across both the metal wall braces 17" and 18 with their planar surfaces disposed at an angle substantially parallel to the angulated side wall 16 whereby these braces 22 constitute angulated attachment and guide walls 22 for respective leg members 14 (see FIG. 2) so that the legs lie in an outwardly inclined direction. These braces also constitute structural members with the wall 17' for load transfer. As can be seen in FIGS. 3 and 8, the structural leg support bracket 13 is a very rigid network of steel braces all welded together and to the attachment wall and side walls 15 and 16. The structural bracket 13 consists essentially of three horizontal parallel, spaced, braces, namely wall 15, the composite angle member 17 and the lower brace 18. A pair of leg attachment braces also interconnect with the horizontal braces and comprise side walls 16 and flanges 22 spaced apart and welded together such as by welds 9. These flanges 22 are provided with holes 20' to receive the pivot pins 20 therethrough for hinging the leg members, and the hinge pin 20 is not subjected to loading. The load transfer is effected through the structurel members and the leg members.

Figure 2:
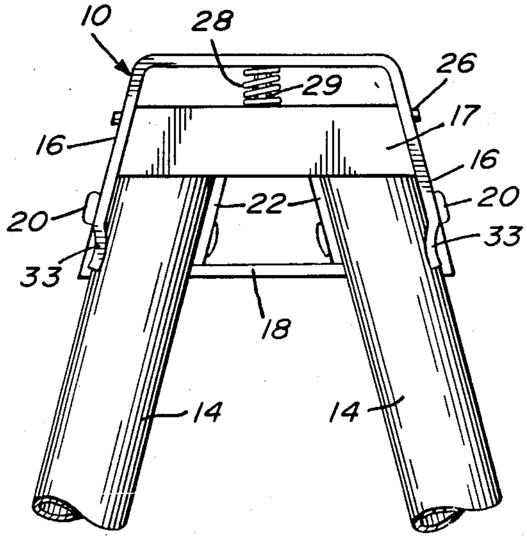
FIG. 2 is an end view of the leg attachment bracket showing the leg members in their position of use.
Figure 3:
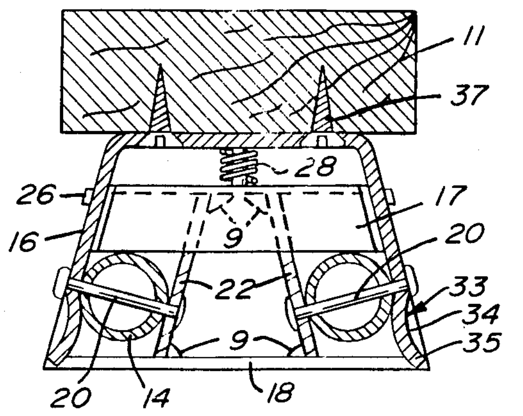
FIG. 3 is an end view, similar to FIG. 2, but showing the leg members in their storage position.

In order to retain the leg members 14 in a secure and rigid position of use, as shown in FIGS. 1*a*, 2 and 4, there is further provided lock means in the form of an arresting pivotal member 23 which is herein comprised of a small rectangular steel plate which is of substantially L-shaped form whereby to define a leg abutment portion 24 and an actuating lever portion 25. The member 23 is welded or otherwise secured to a pivot pin 26 which extends through pivot holes 27 provided in the angulated side wall members 16 whereby to secure same to the bracket. A coil spring 28 is held captive between the leg abutment portion 24 and the underside of the attachment wall 15 whereby to bias the leg abutment portion away from the attachment wall 15 and against the top end portion 19 of the leg member 14 when the leg member is in its position of use, as shown in FIG. 4. Guide means in the form of a guide pin 29 maintains the spring 28 captive in its position during the displacement of the leg abutment portion 24.

Figure 5:
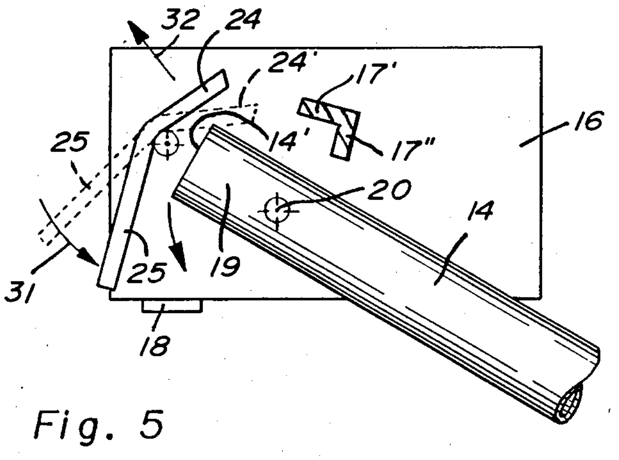
FIG. 5 is a fragmented section view similar to FIG. 4 showing the operation of the leg attachment mechanism.

As clearly shown in FIGS. 4 and 5, when the leg member 14 is in its position of use, the top end portion 19 of the leg member is held captive on both sides thereof by the metal brace wall 17" and the forward edge of the leg abutment portion 24. The angle of the leg abutment portion relative to the longitudinal axis 50 of the leg is selected at slightly more than 90° whereby not to receive the leg abutment portion or displace same when pressure is applied thereagainst by pressure on the leg member in the direction as shown by arrow 30 in FIG. 5. Also, this angle is selected whereby when the actuating lever portion 25 is depressed downwardly in the direction of arrow 31, as shown in FIG. 5, the leg abutment portion 24 will move upwardly in the direction of arrow 32 and clear the top end 14' of the leg member 14 to permit passage thereof whereby to locate the leg member 14 to its storage position where each leg member 14 lies substantially side-by-side and in the horizontal plane of the bracket attachment wall 15. When the leg members 14 are hinged rearwardly toward their angled position of use, it can be seen (see FIG. 5) that the top end portion 19 will abut the underside of the leg abutment portion 24 (as in phantom line) and move it upwardly in the direction of arrow 32 against the spring pressure. As soon as the top end portion 19 of the leg 14 reaches its position of use and is lying against the metal wall brace 17", the leg abutment portion 24 will snap into an engagement position under the influence of the spring pressure of the spring 28. Thus, the leg member is automatically locked in position and cannot be unlocked unless the actuating lever 25 is pushed inwardly.

Figure 6:
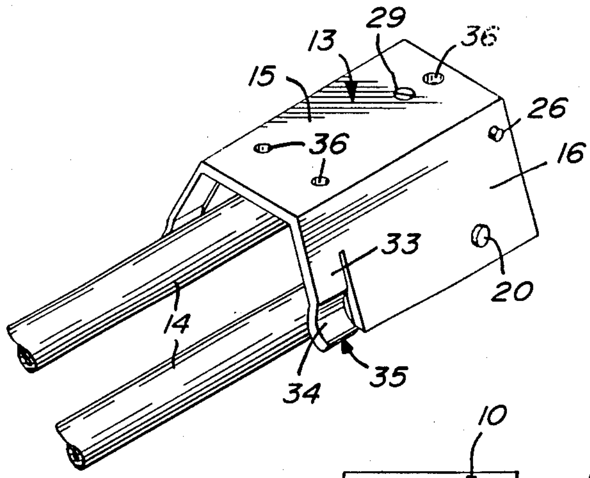
FIG. 6 is a perspective view of the leg attachment bracket showing the leg members in their storage position and engaged by the leg retention means.

Referring now to FIGS. 3 and 6, it can be seen that the angulated side walls 16 of the bracket 13 are each provided with leg retantion means in the form of an indented end strip portion 33 in each side 10 whereby to frictionally engage a respective one of the leg members when in their storage position. As shown in FIG. 3, the strip member 33 is provided with a small V-shaped indentation 34 having a lower outwardly inclined flange portion 35 whereby when the leg member 14 is displaced inwardly under the bracket 13, it will cause the end strip portion 33 to flex outwardly with the indentation 34 applying frictional retention against the leg member 14 to retain it in its stored horizontal position. As also shown in FIG. 6, one or more holes 36 are provided in the attachment wall 15 whereby to secure the bracket to a support member such as the wooden board 11. These holes 36 are provided at convenient locations in the wall 15 whereby to permit passage of a screwdriver from the underside of the bracket to insert screw fasteners 37 (see FIG. 2) into the board 11.

Figure 7:
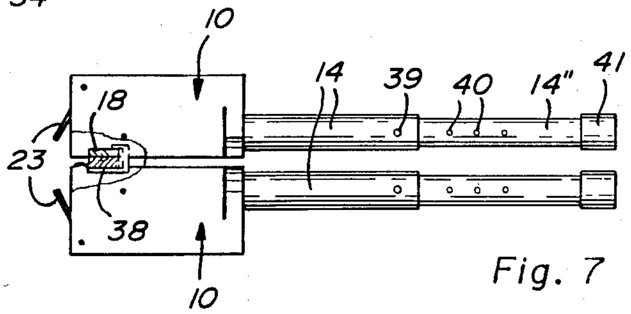
FIG. 7 is a fragmented side view showing two leg support structures interlocked together.

As previously described, these legs support structures 10 may have various utilities and, accordingly, they may be stored not attached to any support member. For this purpose, and referring to FIG. 7, there is provided an interlocking means in the form of a spring clamp 38 which is welded to one brace 38 or may simply clamp both braces together to retain two structures 10 together. Thus, two structures 10 may be secured together, as shown in FIG. 7, in side-by-side relationship whereby these can be conveniently stored and transported. In order to provide a compact unit for storage, the legs 14 may be formed as telescopic legs, as shown in FIG. 7, with a lower portion of the leg 14" being telescopically received in an upper portion and retained therein by a lock pin 39. Also, the lower leg portion 14" may be provided with a series of spaced-apart holes 40 to adjust the length of the leg member 14. Shoe caps 41 are provided at the end of the legs to enhance gripping and to protect a floor surface on which the legs are supported.

Figure 9:
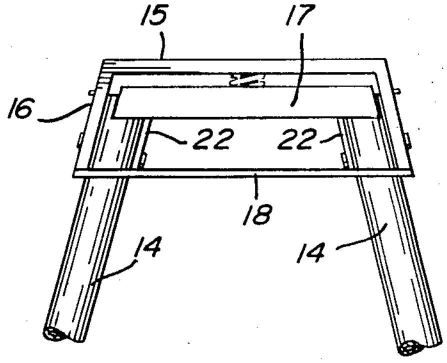
FIG. 9 is an end view of a modified leg support structure.
Figure 10:
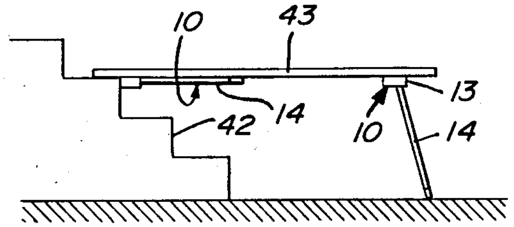
FIG. 10 is a side view illustrating another use of the leg support structure.

FIG. 9 shows a modification of the leg support structure and as hereinshown, the flat attachment wall 15 is made much wider whereby to accommodate a wider support board thereover to constitute a table or bench. Such wide structures are useful to painters whereby to provide a stair scaffold as shown in FIG. 10 for use on a staircase 42. With such a structure, it would be preferable, although not essential, to provide leg support structures 10 with telescopic legs as shown in FIG. 7 whereby to maintain the support platform or board 43 substantially horizontal, regardless of the height of the stairs within the staircase.

It is within the ambit of the present invention to cover any obvious modifications of the preferred embodiment described herein, provided such modifications fall within the scope of the appended claims. For example, it is conceivable that portions of the bracket may be constructed of rigid plastics material. Also, the interlocking means for securing two or more of these leg support structures together may be constituted differently than that shown in the drawings. Also, the leg support structure may have many other uses not mentioned herein. Further, the lock means 23 may be provided by a lock pin removably secured across the side walls 16 and aligned to abut the leg members 14 at their top end portions 19. Alternatively, this lock pin may extend on the opposite side of the leg members 14 adjacent the metal brace 18.

I claim:

1. A leg support structure comprising a leg attachment bracket having a pair of leg members; a top attachment flange for securing said bracket to a support member to be supported elevated by said leg members, said top attachment flange having opposed outwardly angulated side wall members, a leg support structure disposed inwardly of said angulated side wall members and having a pair of angulated guide walls, each guide wall being disposed substantially parallel to a respective one of said angulated side wall members, each leg member of said pair of leg members being retained between a respective one of said side wall members and guide walls by a pivot pin secured across associated pairs of a side wall member and a guide wall, a structural wall member having a load transfer surface disposed for receiving in abutment a top end of a load transfer surface disposed for receiving in abutment a top end of said leg members in close contact therewith when said leg members are pivotally displaced to their position of use whereby a load disposed on said support structure is transferred axially along said leg members from a top end thereof, said pivot pin of each leg member being a substantially non-load bearing pin connection, said structural wall member also having a depending abutment wall constituting an arresting means to maintain said leg members in aid position of use with said leg members angulated toward a first inclined direction and a second outwardly inclined direction, a stationary abutment member secured on a side of said leg members opposed to said depending abutment wall when said leg members are in said position of use, said pivot connection being disposed intermediate said abutment wall and said stationary abutment member at a location to permit said leg members to be positioned to said position of use and to a storage position where said leg members lie in a close side-by-side relationship, said guide walls being welded to said structural wall member and said stationary abutment member to constitute a composite structural brace for said structural wall having said load transfer surface.

2. A leg support structure as claimed in claim 1 wherein there is further provided lock means to retain said leg members captive between said arresting means and to release them for displacement to their storage position.

3. A leg support structure as claimed in claim 1 wherein said attachment flange has at least one bore therein for the passage of a fastener to secure said flange to said support member, said support member feing a wooden board.

4. A leg support structure as claimed in claim 1 wherein said top attachment flange is a flat attachment wall, said angulated side wall members being angulated side walls intergrally formed with said attacvhment wall from a common metal sheet and defining a substantially inverted U-shaped frame.

5. A leg support structure as claimed in claim 4 wherein said depending abutment wall is secured transversely across said angulated side walls under and adjacent said top attachment wall, said stationary abutment member being secured transversely across a free edge of said angulated side walls.

6. A leg support structure as claimed in claim 2 wherein said lock means is an arresting pivotal member having a leg abutment portion and an actuating lever portion, said arresting pivotal member being pivotally connected to said support bracket whereby to locate said leg abutment portion against said pair of leg members above its pivotal connection and on a side of said leg members opposite said structural wall member to retain said leg members captive in said position of use.

7. A leg support structure as claimed in claim 6 wherein said leg abutment portion of said arresting pivotal member is spring biased by spring means so that said leg abutment portion is biased in a direction toward a top end portion of said leg members.

8. A leg support structure as claimed in claim 7 wherein said spring means is a coil spring held captive between said leg abutment portion and said attachment means.

9. A leg suppolrt structure as claimed in claim 3 wheerein said lock means is an arresting pivotal angle member secured to a pivot pin which is held across said aangulated side walls, said angle member defining a leg abutment portion and an actuating lever portion, spring means biasing said leg abutment portion to a leg engaging position whereby said leg abutment portion is disposed adjacent a top end portion of said leg members above the pivotal connection of said leg members and on a side of said leg members opposite said structural wall member.

10. A leg support structure as claimed in claim 9 wherein said actuating lever portion is an actuating flange extending outwardly from under said top attachment flange, said actuating flange when displaced in a direction against said spring means causing said leg abutment portion to be displaced out of the arcuate path of displacement of a top end of said leg members to permit said leg members to be displaced to said storage position.

11. A leg support structure as claimed in claim 4 wherein said angulated side walls are each provided with leg retention means whereby to hold each leg of said pair of legs in said storage position.

12. A leg support structure as claimed in claim 11 wherein said leg retention means is an indented end strip portion made in each of said angulated side walls to frictionally engage a respective one of said leg members when in said storage position.

13. A leg support structure as claimed in claim 1 wherein there is further provided interlocking means to removably secure two of said support structures together.

14. A leg support structure as claimed in claim 4 wherein said interlocking means is a spring clamp adapted to receive opposed metal braces therein whereby to removably secure two leg support structures together for storage.

* * * * *